United States Patent [19]

Pagano et al.

[11] Patent Number: 5,003,334

[45] Date of Patent: Mar. 26, 1991

[54] FILM CASSETTE WITH FILM EXPOSURE STATUS INDICATOR

[75] Inventors: Daniel M. Pagano, Henrietta; Stephen H. Miller, Rochester, both of N.Y.

[73] Assignee: Eastman Kodak Company, Rochester, N.Y.

[21] Appl. No.: 520,569

[22] Filed: May 7, 1990

[51] Int. Cl.$^5$ .................................. G03B 17/26
[52] U.S. Cl. .................................. 354/275
[58] Field of Search ..................... 354/275, 215

[56] References Cited

U.S. PATENT DOCUMENTS

| | | | |
|---|---|---|---|
| 4,423,943 | 1/1984 | Gold | 354/275 |
| 4,802,633 | 2/1989 | Beery | 354/275 X |
| 4,834,306 | 5/1989 | Robertson et al. | 354/275 X |
| 4,846,418 | 7/1989 | Fairman | 354/275 X |
| 4,848,693 | 7/1989 | Robertson | 354/275 X |
| 4,875,638 | 10/1989 | Harvey | 354/275 X |
| 4,887,110 | 12/1989 | Harvey | 354/275 |
| 4,894,673 | 1/1990 | Beach | 354/275 |

*Primary Examiner*—L. T. Hix
*Assistant Examiner*—Jae N. Noh
*Attorney, Agent, or Firm*—Roger A. Fields

[57] ABSTRACT

A film cassette comprises a film spool rotatable inside a lighttight cassette shell to thrust a filmstrip coiled about the spool automatically to the exterior of the shell, and a film exposure status indicator movable from an unexposed position for providing a visible indication that the filmstrip is unexposed to respective partly exposed and fully exposed positions for providing visible indications that the filmstrip is only partly exposed or is substantially exposed. According to the invention, the spool and the status indicator include engagable means for moving the status indicator to its exposed position from its unexposed and partly exposed positions only in response to rotation of the spool.

12 Claims, 14 Drawing Sheets

FILM CASSETTE WITH FILM EXPOSURE STATUS INDICATOR

CROSS REFERENCE TO RELATED APPLICATIONS

Reference is made to commonly assigned copending applications Ser. No. 07/520,309 entitled FILM CASSETTE WITH FILM EXPOSURE STATUS INDICATOR, and filed May 7, 1990 in the names of Stephen H. Miller and Daniel M. Pagano; Ser. No. 07/520,568 entitled CAMERA APPARATUS FOR USE WITH FILM CASSETTE HAVING FILM EXPOSURE STATUS INDICATOR, and filed May 7, 1990 in the names of Stephen H. Miller and Daniel M. Pagano; Ser. No. 07/384,332 entitled FILM CASSETTE HAVING FILM EXPOSURE STATUS INDICATOR, and Filed July 24, 1989 in the names of David C. Smart et al; Ser. No. 07/390,931 entitled CAMERA FOR USE WITH FILM CASSETTE HAVING FILM EXPOSURE STATUS INDICATOR, and filed Aug. 8, 1989 in the names of David C. Smart et al; and Ser. No. 07/436,265 entitled CAMERA APPARATUS FOR PREVENTING LOAD OF EXPOSED FILM, and filed Nov. 14, 1989 in the name of David C. Smart.

BACKGROUND OF THE INVENTION

1. Field of the Invention

The invention relates generally to the field of photography, and in particular to a film cassette containing roll film. More specifically, the invention relates to a film cassette having indicator means for informing the photographer that a filmstrip inside the cassette is unexposed, only partly exposed, or substantially exposed.

2. Description of the Prior Art

In conventional 35 mm film manufacturers' cassettes, such as manufactured by Eastman Kodak Co. and Fuji Photo Film Co. Ltd., the filmstrip is wound on a flanged spool which is rotatably supported within a cylindrical shell. A leading or forwardmost portion of the filmstrip approximately 2½ inches long, commonly referred to as a "film leader", normally protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader portion protruding from the slit will remain stationary. The film roll can expand radially until a non-slipping relation is established between its outermost convolution and the inner curved wall of the shell. Once this nonslipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader portion to draw the filmstrip out of the shell.

A 35 mm film cassette has been proposed which, unlike conventional film cassettes, can be operated to automatically advance a film leader out of the cassette shell by rotating the film spool in the unwinding direction. The film leader is normally non-protruding, i.e. it is located entirely within the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner curved wall of the cassette shell. The trailing end of the filmstrip is secured to the film spool, and the forward or leading end of the filmstrip is slightly tapered purportedly to allow it to freely extend from between the circumferential lips and rest against the shell wall. During initial unwinding rotation of the film spool, the leading end of the filmstrip is advanced to and through a non-lighttight film passageway in order to exit the cassette shell. As a result, all that is needed to advance the filmstrip out of the cassette shell is to rotate the film spool in the unwinding direction. However, according to U.S. Pat. No. 4,423,943, the film cassette is intended to be loaded in a camera only after the non-protruding leader is advanced out of the cassette shell. In the patent, it is suggested that one manually rotate the film spool relative to the cassette shell until the film leader can be manually grasped and attached to a film advancing device in the camera. Thus, the camera is not used to rotate the film spool to advance the film leader from the cassette shell.

More recently, in U.S. Pat. No. 4,834,306, granted May 30, 1989, U.S. Pat. No. 4,846,418, granted July 11, 1989, U.S. Pat. No. 4,848,693, granted July 18, 1989, U.S. Pat. No. 4,875,638, granted Oct. 24, 1989, U.S. Pat. No. 4,887,110, granted Dec. 12, 1989, and U.S. Pat. No. 4,894,673, granted Jan. 16, 1990, there are disclosed other film cassettes wherein a non-protruding leader is advanced automatically out of the cassette shell responsive to rotation of the film spool in an unwinding direction. In those patents, as compared to U.S. Pat. No. 4,423,943, however, there is no suggestion to manually rotate the film spool to expel the film leader.

In conventional 35 mm film manufacturers' cassettes, after the filmstrip is completely exposed, the film spool is rotated in a winding direction to rewind the film leader into the cassette shell. Since the film leader cannot subsequently be advanced out of the cassette shell (because of the binding effect between the film roll and the shell), this usually serves as an indication that the filmstrip is completely exposed. Conversely, in the film cassettes disclosed in U.S. Pat. Nos. 4,423,943, 4,834,306, 4,846,418, 4,848,693, 4,875,638, 4,887,110, and 4,894,673, the film leader can be automatically advanced out of the cassette shell by rotating the film spool in the unwinding direction. This can be done regardless of whether the filmstrip is unexposed, completely exposed, or only partly exposed. Some of the film cassettes disclosed in these patents provide no indication as to the exposure status of the filmstrip, others provide some indication of the exposure status.

THE CROSS-REFERENCED APPLICATIONS

Cross-referenced applications Serial Nos. 07/384,332 and 07/436,265 each disclose a film cassette capable of advancing a filmstrip automatically out of a light-tight cassette shell whether the filmstrip is unexposed, only partly exposed, or substantially exposed. The film cassette is characterized in that a film exposure status indicator can be disposed in any one of three unique exposure-related positions comprising an unexposed position for providing a visible indication that the filmstrip is unexposed, a partly exposed position for providing a visible indication that the filmstrip is only partly exposed, and a fully exposed position for providing a visible indication that the filmstrip is substantially exposed. However, camera apparatus such as disclosed in cross-referenced application Ser. No. 07/390,931 is required to engage the status indicator to move the indicator from its unexposed position to its partly exposed and fully exposed positions.

SUMMARY OF THE INVENTION

According to the invention, a film cassette comprising a film spool supported inside a lighttight cassette shell for rotation in an unwinding direction to thrust a filmstrip coiled about the spool to the exterior of the shell, to expose the filmstrip, and in a winding direction to return exposed film to the interior of the shell, to protect the filmstrip from ambient light, and a film exposure status indicator supported for movement relative to the shell to an exposed position for providing a visible indication that the filmstrip is exposed, is characterized in that:

said spool and said status indicator include respective cooperating means for moving the status indicator to its exposed position automatically in response to rotation of the spool in one of the unwinding and winding directions.

More specifically, a film cassette comprising a film spool supported inside a lighttight cassette shell for rotation to thrust a filmstrip coiled about the spool to the exterior of the shell whether the filmstrip is unexposed or is only partly exposed, and a film exposure status indicator supported for movement relative to the shell from an unexposed position to respective partly exposed and fully exposed positions for providing visible indications that the filmstrip is only partly exposed or is substantially exposed, is characterized in that:

said spool and said status indicator include respective cooperating means for moving the status indicator to its fully exposed position alternately from its unexposed and partly exposed positions only in response to rotation of the spool.

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

THE FILM CASSETTE

Figure 1:
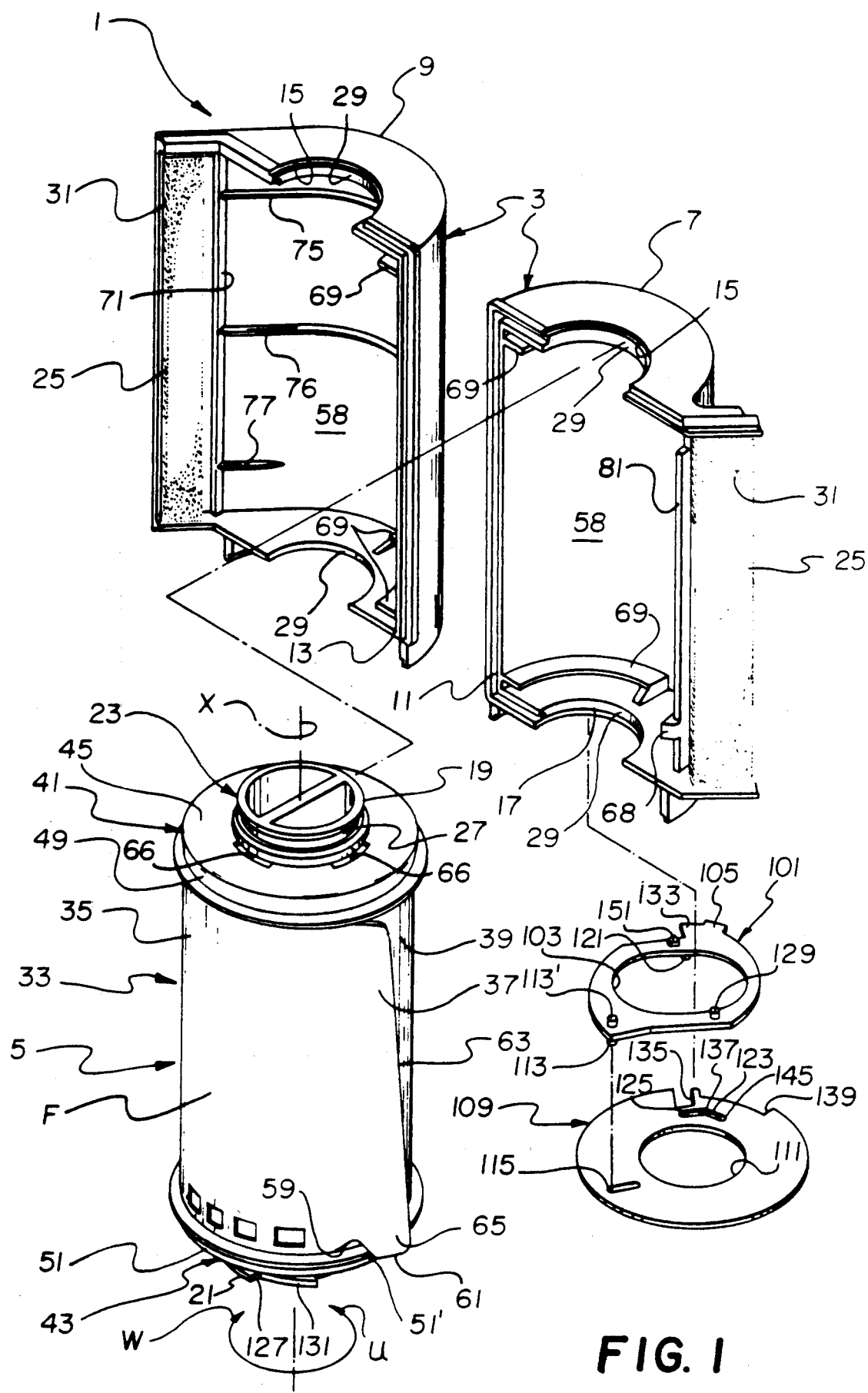
FIG. 1 is an exploded perspective view of a film cassette having a film exposure status indicator according to a preferred embodiment of the invention.
Figure 2:
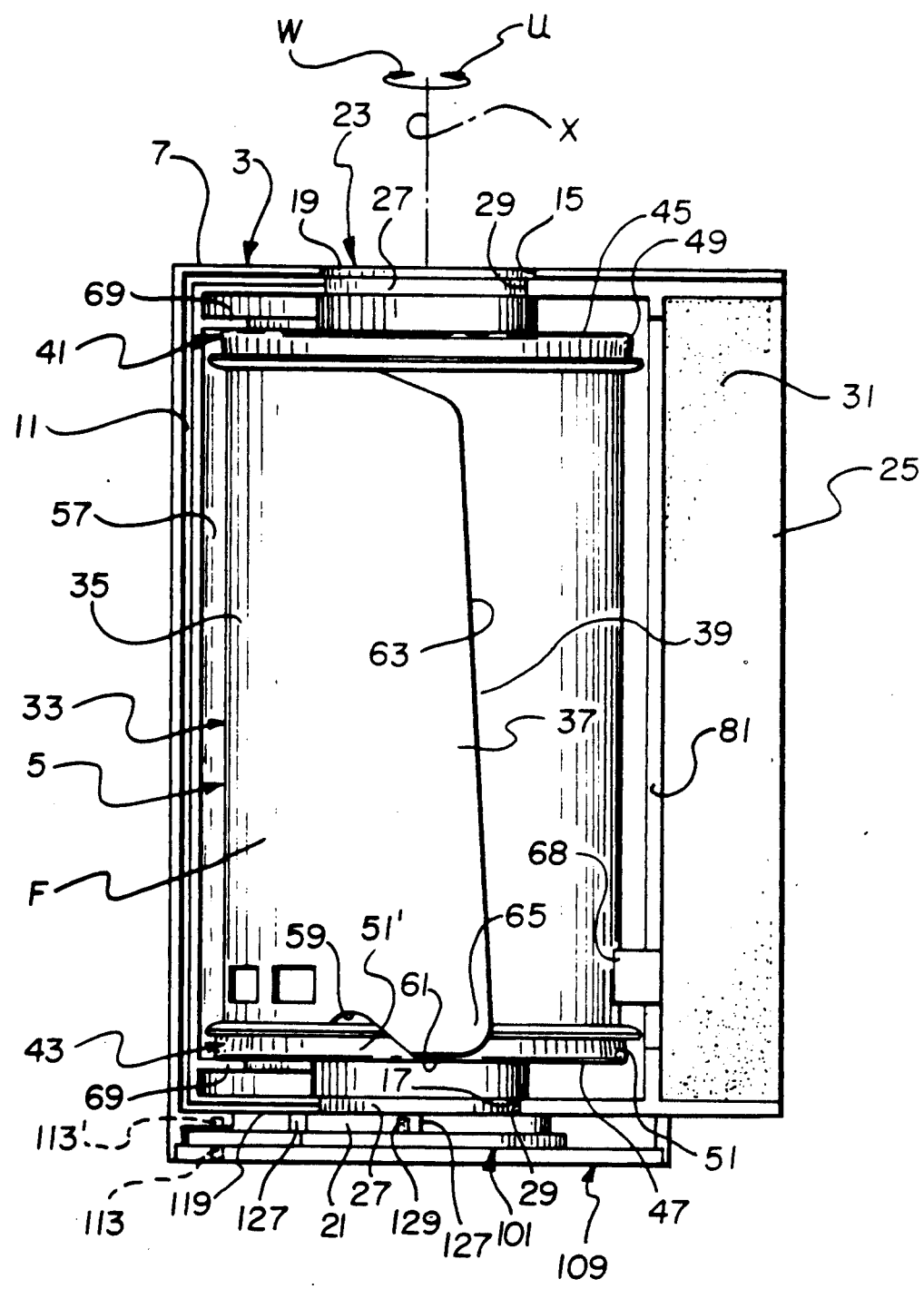
FIG. 2 is an elevation view of the film cassette, illustrating the cassette shell open to reveal a film roll coiled about a film spool.
Figure 13:
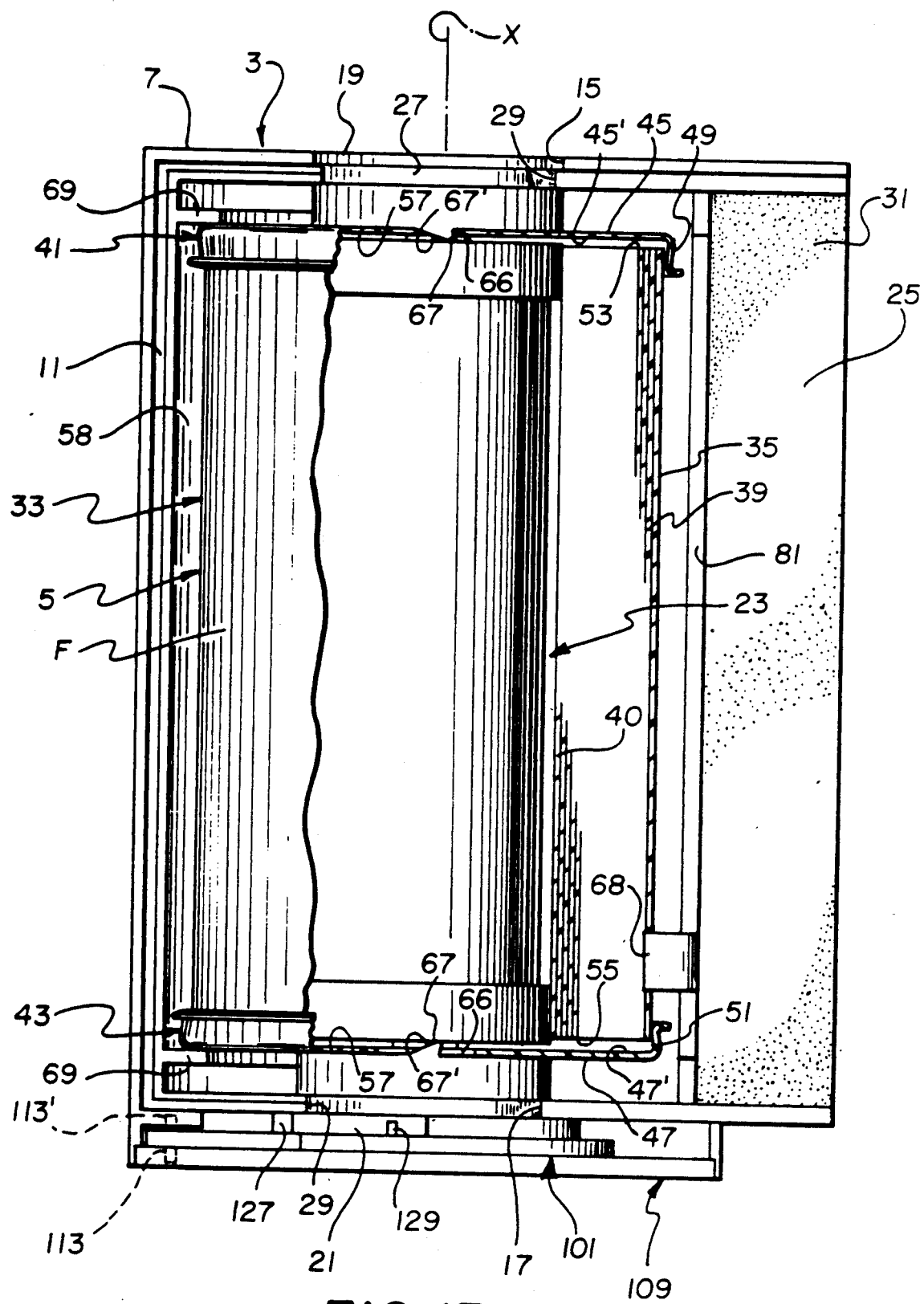
FIG. 13 is an elevation view partly in section of the film roll and the film spool, illustrating the manner in which one of a pair of film confining flanges of the spool may be fixed to the spool for concurrent rotation with the spool.

Referring now to the drawings, FIGS. 1, 2 and 13 depict an improved 35 mm film cassette 1 comprising a light-tight cassette shell 3 and a film spool 5 which is rotatable about an axis X in film unwinding and winding directions U and W within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for relatively shorter and longer opposite open-end pieces 19 and 21 of a spool core or hub 23, and they define a narrow relatively-straight film passageway 25 to the exterior of the cassette shell 3. The shorter and longer open-end pieces 19 and 21 of the spool core 23 each include an annular peripheral groove 27 which mates with a corresponding edge portion 29 of the respective openings 15 and 17 in the cassette shell 3 to rotatably support the film spool 5 for rotation about the axis X in the film unwinding and winding directions U and W. A known black velvet or plush material 31 lines the interior of the film passageway 25 to prevent ambient light from entering the film passageway.

Figure 3:
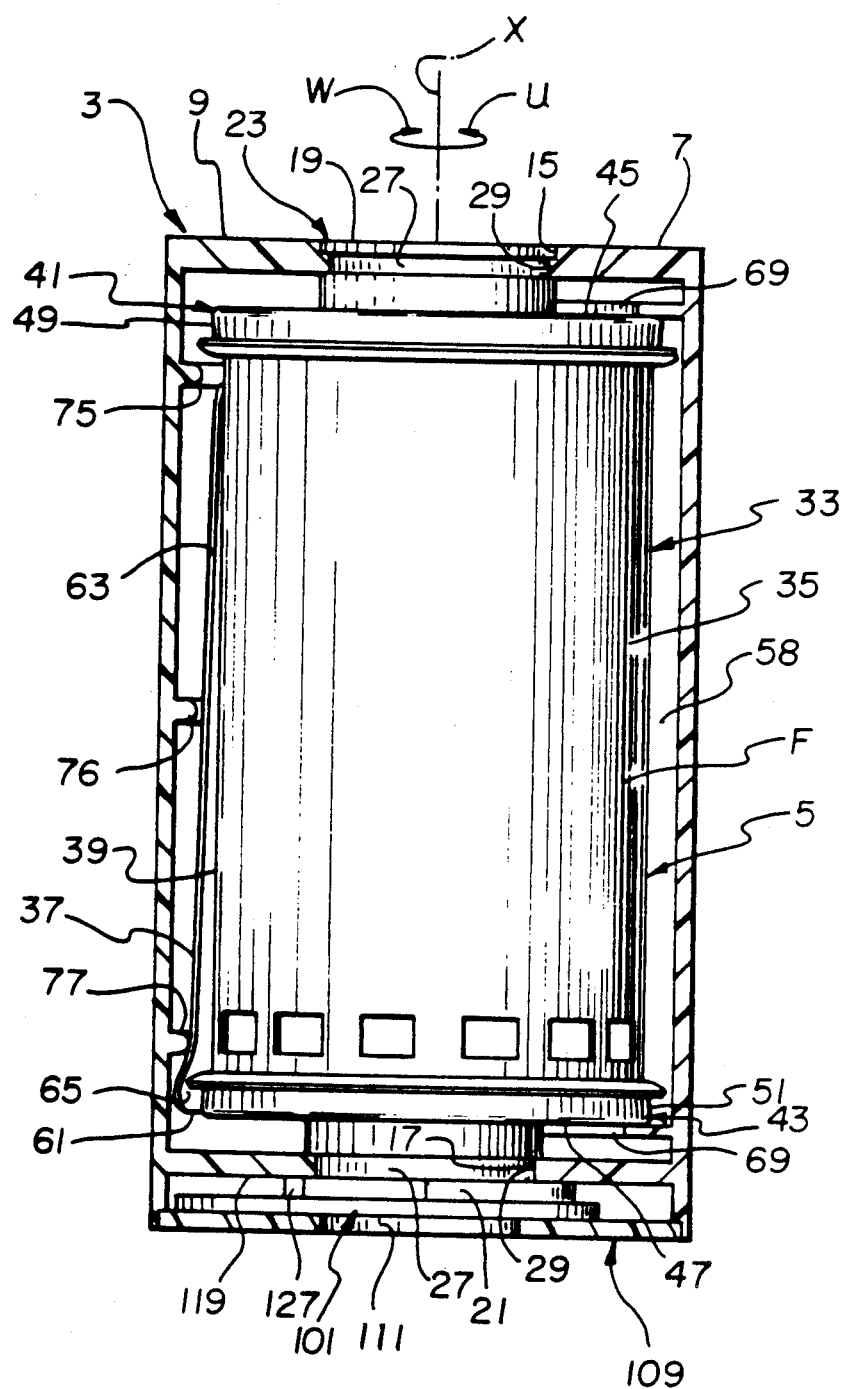
FIG. 3 is an elevation view similar to FIG. 2, through in section.

A roll 33 of 35 mm filmstrip F is coiled about the spool core 23 to form successive film convolutions. As shown in FIG. 3, the film roll 33 includes an outermost convolution which comprises a film leader 35 having a leading or forward end 37, and it includes a next-inward convolution 39 coiled behind the outermost convolution. The inner or trailing end of an innermost convolution 40 of the film roll 33 is secured to the spool core 23 using known attachment means, not shown. See FIG. 13.

Figure 9:
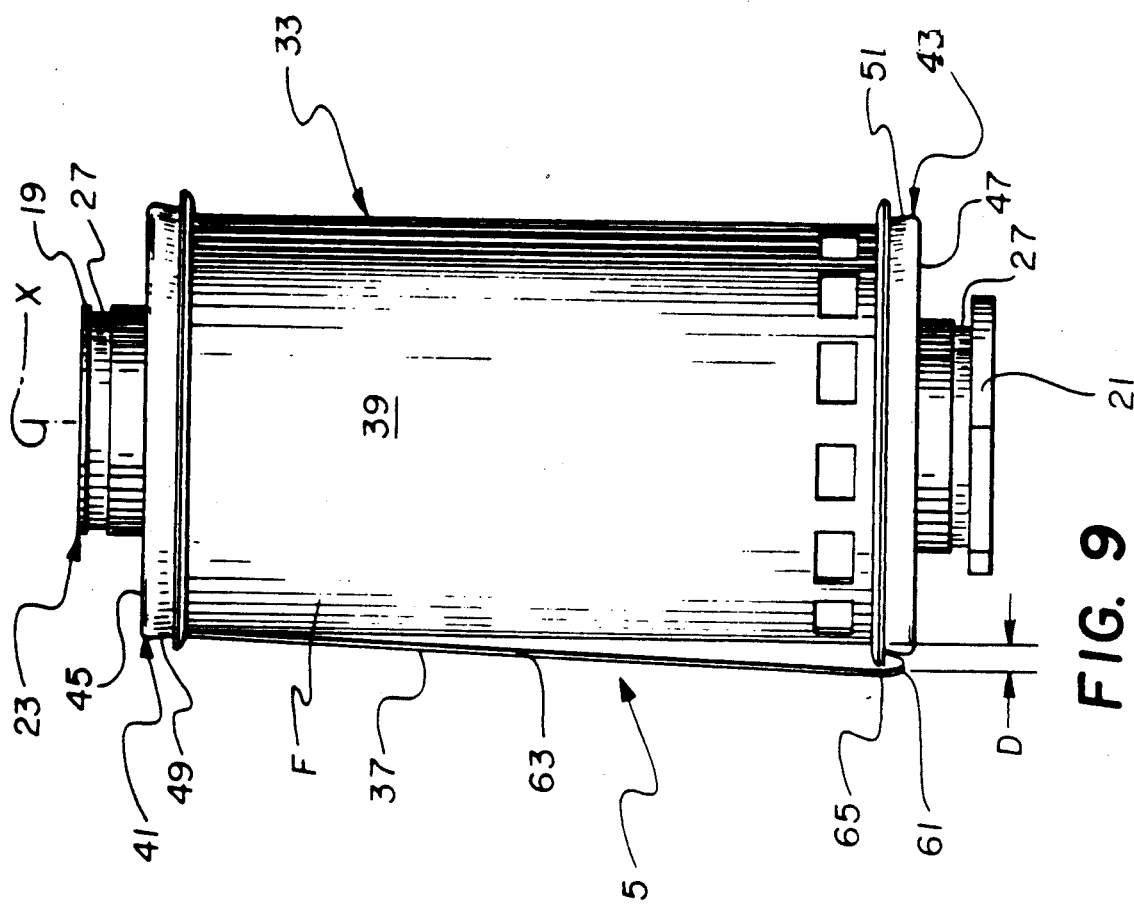
FIGS. 8 and 9 are elevation views of the film roll and the film spool, illustrating the manner in which the film roll is originally stored on the film spool.
Figure 8:
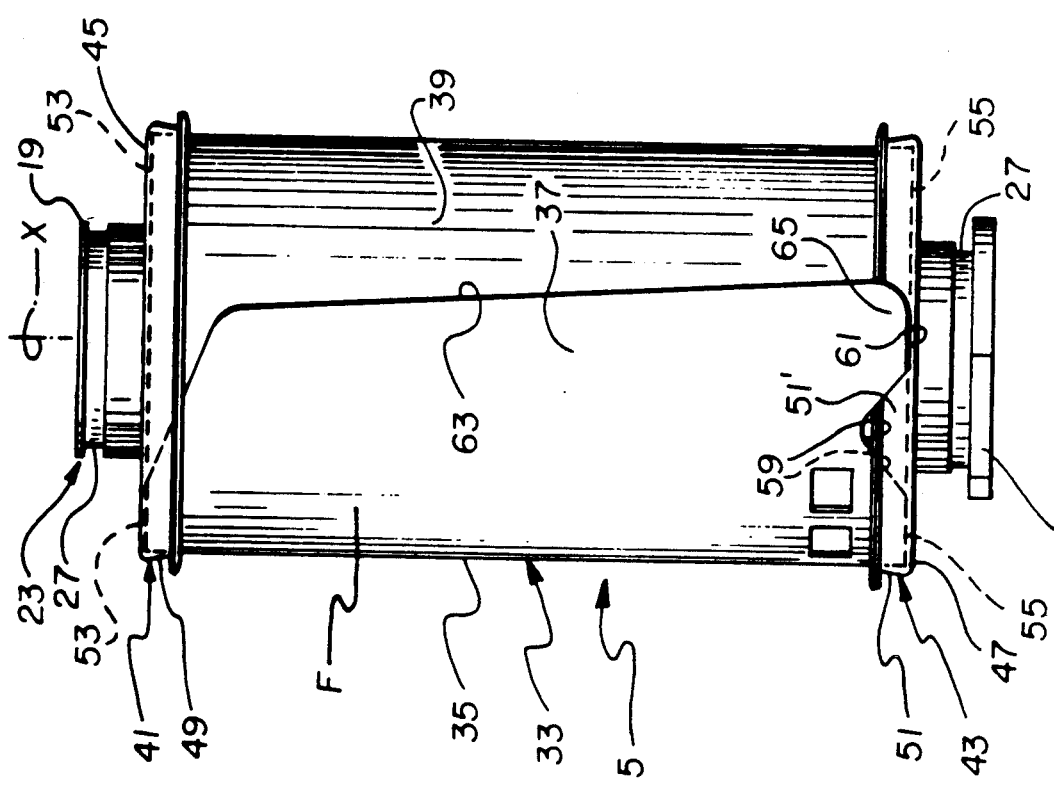

A pair of upper and lower identical, very thin, flexible film constraining flanges 41 and 43 are coaxially spaced along the spool core 23 as shown in FIGS. 1, 2, 8, 12 and 13. The two flanges 41 and 43 comprise respective integral disks 45 and 47 and respective integral annular lips or skirts 49 and 51 which circumferentially extend from the disks. The two disks 45 and 47 cover opposite substantially flat sides of the film roll 33 which are defined by corresponding opposite longitudinal edges 53 and 55 of each successive convolution of the film roll, and they have respective central holes 56 through which the spool core 23 coaxially extends to permit rotation of the spool core relative to the flanges 41 and 43. See FIG. 12. Respective circumferential gaps 57 are provided in the spool core 23 for supporting the flanges 41 and 43 at their disks 45 and 47 to permit the flanges to be independently rotated about the axis X. The two gaps 57 are sufficiently spaced from one another along the spool core 23 to maintain respective inner faces 45' and 47' of the disks 45 and 47 slightly spaced from the longitudinal edges 53 and 55 of each successive convolution of the film roll 33. See FIG. 13. The annular lips 49 and 51 overlap the film leader (outermost convolution) 35 of the film roll 33 radially outwardly of the longitudinal edges 53 and 55 of the leader to radially confine the leader to thus prevent it from radially expanding or clock-springing into substantial contact with an interior curved wall 58 of the cassette shell 3. A lip-receiving notch 59 is cut in the film leader (outermost convolution) 35 along its longitudinal edge 55, relatively close to its leading end 37, to receive a peripheral section 51' of the annular lip 51. This allows a relatively short edge-section 61 of the film leader (outermost convolution) 35 connecting the leading end 37 and the notch 59 to overlap the annular lip 51 radially outwardly to thus maintain the leading end spaced a radial distance D from the next-inward convolution 39 of the film roll 33. See FIGS. 4 and 9. The leading end 37 has a forward edge 63 inclined from the longitudinal edge 53 of the film leader (outermost convolution) 35 to the other longitudinal edge 55 of the leader to form a forward-most tip or tab 65 of the leader which, like the edge-section 61, overlaps the annular lip 51 radially outwardly. See FIGS. 1, 2, 8 and 9.

The two flanges 41 and 43 have a plurality of concentric arcuate slots 66 cut in their respective disks 45 and 47 to longitudinally extend in the film unwinding and film winding directions U and W. Engagement means in the form of respective hook-like members 67, located on the shorter and longer open-end pieces 19 and 21 of the spool core 23, are normally located in the concentric slots 66 for movement along the slots into engagement with the flanges 41 and 43 responsive to rotation of the spool core relative to the flanges in the unwinding direction U and for movement along the slots out of engagement with the flanges responsive to rotation of the spool core relative to the flanges in the winding direction W. See FIGS. 12 and 13. Preferably, each of the hook-like members 67 has an end face 67' that is beveled to ease the hook-like member out of one of the concentric slots 66 responsive to rotation of the spool core 23 relative to the flanges 41 and 43 in the winding direction W, in the possible event the spool core is rotated relative to the flanges far enough in the winding direction to back the hook-like member out of the slot.

Figure 4:
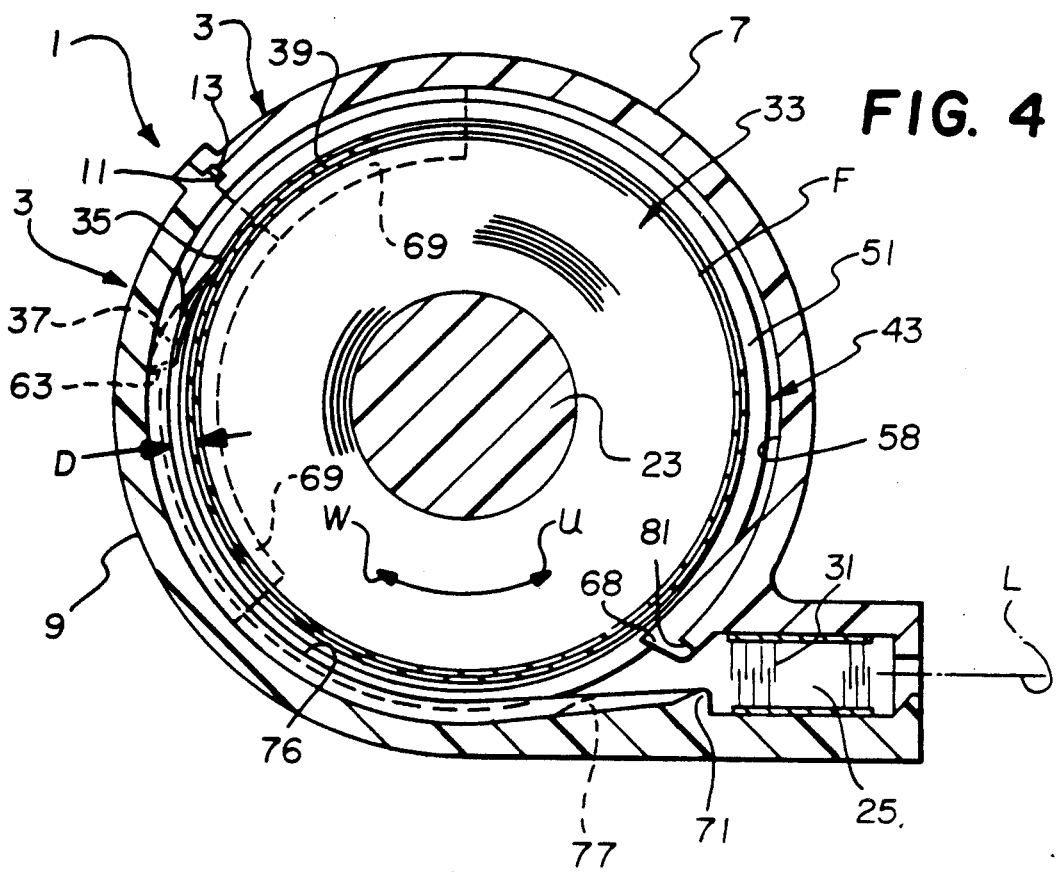
FIG. 4 is an end view partly in section of the cassette shell, the film roll and the film spool, illustrating the manner in which the film roll is originally stored on the film spool.
Figure 5:
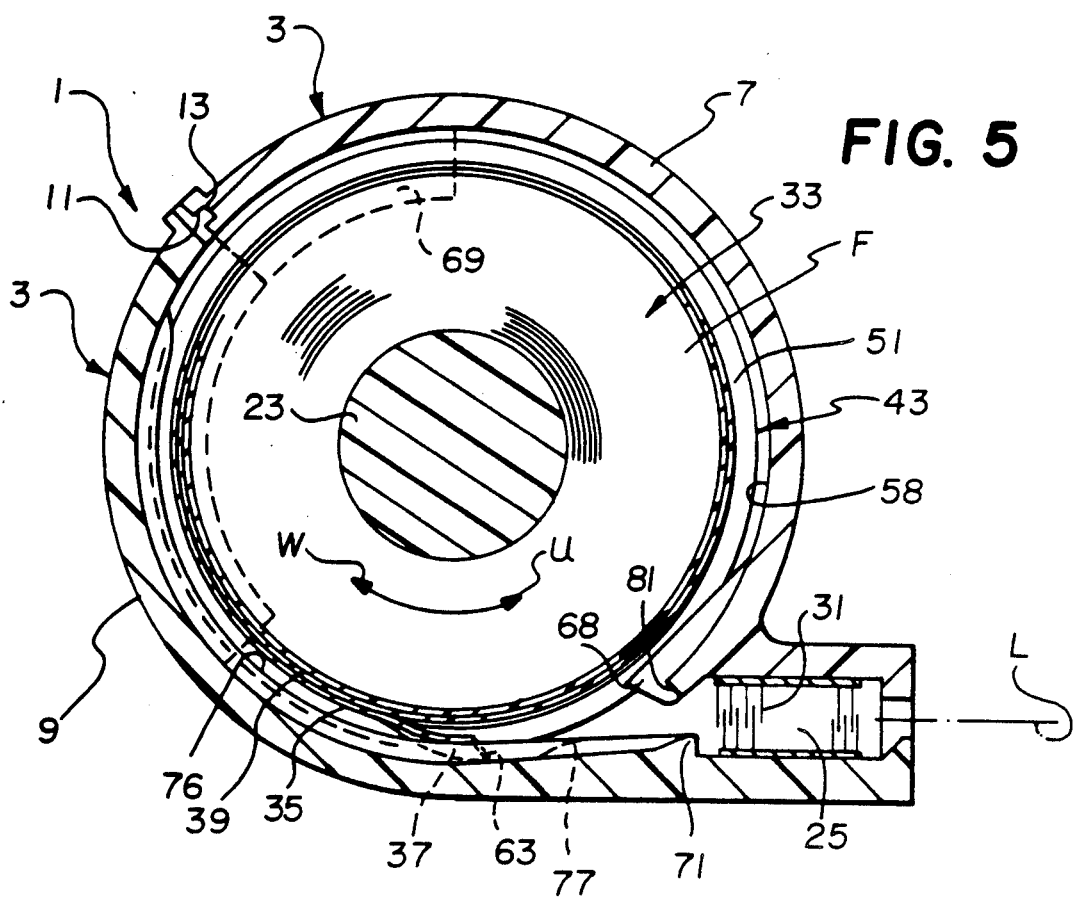
FIGS. 5, 6, and 7 are end views similar to FIG. 4, illustrating the manner in which the film roll is unwound from the film spool.

A film stripper-guide 68 projecting from the interior wall 58 of the cassette half 7 is positioned immediately inward of the inner entrance to the film passageway 25 to be received between the leading end 37 of the film leader (outermost convolution) 35 and the next-inward convolution 39, close to the forward-most tip 65 of the leader, to pick up the leading end and guide it into the film passageway responsive to rotation of the spool core 23 in the unwinding direction U. See FIGS. 1 and 4-7. The leading end 37 will be advanced over the stripper-guide 68 and into the film passageway 25, rather than between the stripper-guide and the next-inward convolution 39, because it is spaced the radial distance D from the latter convolution. Thus, as shown in FIG. 4, the leading end 37 will be located within range of the stripper-guide 68 due to such spacing D from the next-inward convolution 39.

Figure 10:
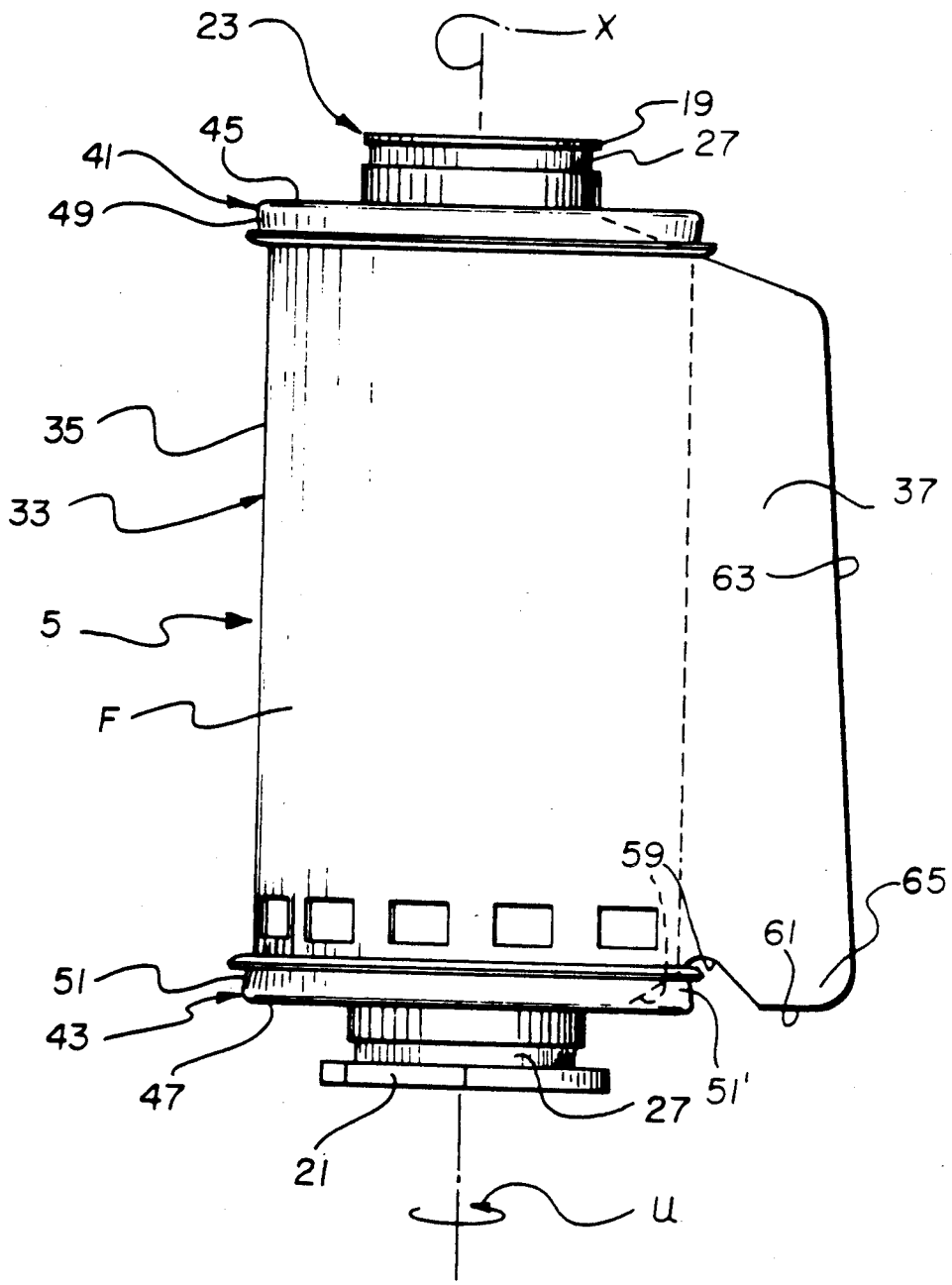
FIGS. 10 and 11 are elevation views similar to FIGS. 8 and 9, illustrating the manner in which the film roll is unwound from the film spool.

When the leading end 37 of the film leader (outermost convolution) 35 is advanced over the stripper-guide 68 responsive to rotation of the spool core 23 in the unwinding direction U, the longitudinal edges 53 and 55 of the leader start to gently flex respective arcuate portions of the two flanges 41 and 43 away from one another, i.e. farther apart, first to allow the notch 59 to separate from the lip section 51', and then to allow successive longitudinal sections of the leader to uncoil from between the flanges and exit to the outside of the cassette shell 3. See FIGS. 10 and 11. The flexing of the flanges 41 and 43 occurs because the film width $W_F$ between the longitudinal film edges 53 and 55 is slightly greater than the axial spacing $A_S$ between the annular lips 49 and 51. Moreover, successive convolutions of the film roll 33 have a resistance to transverse bowing that is greater than the resistance of the flanges 41 and 43 to be flexed. Two pairs of flat curved bearing members 69 project from the interior walls 58 of the respective shell halves 7 and 9 to lie flatly against successive arcuate portions of the two disks 45 and 47 as the flanges 41 and 43 are flexed away from one another, to only allow those flange portions separated from the bearing members to be flexed farther apart. See FIGS. 1, 2 and 4. The bearing members 69 are positioned relatively remote from the film passageway 25. Thus, the leader 35 is only allowed to uncoil from between the flanges 41 and 43 relatively close to the passageway 25. See FIG. 7.

A film flattening rib 71 projects from the interior wall 58 of the cassette half 9 in the vicinity of the inner entrance to the film passageway 25 and the stripper-guide 68 to support successive longitudinal sections of the film leader 35, beginning with its leading end 37, substantially flat widthwise as those sections are freed from the flanges 41 and 43, to facilitate movement of the leading end into the passageway. See FIG. 7. The light-trapping plush 31 within the film passageway 25 is elevated along the passageway slightly beyond a longitudinal center line L of the passageway. The film flattening rib 71 as shown in FIG. 4 projects almost to the center line L in order to support successive sections of the film leader 35 substantially flat at the center line. Preferably, the film-supporting tip or longitudinal edge of the flattening rib 71 is spaced 0.005"-0.030" short of the center line L.

Two substantially parallel curved film supporting ribs 75 and 76 project from the interior wall 58 of the cassette half 7 to longitudinally extend from the film flattening rib 71 to part-way between the pair of bearing members 69 which project from the same wall. See FIGS. 1, 3, and 4. The film supporting ribs 75 and 76 longitudinally extend the entire location at which the film leader (outermost convolution) 35 can escape the confinement of the flanges 41 and 43, when the leader axially flexes the flanges away from one another. The film supporting ribs 75 and 76 as shown in FIG. 3 are positioned to be slightly spaced from the film leader 35, when the leader is confined within the annular lips 49 and 51. Another film supporting rib 77 projects from the interior wall 58 of the cassette half 7, opposite the stripper-guide 68. The other rib 77 is substantially parallel to and shorter than the first-two ribs 75 and 76. All three of the ribs 75–77 longitudinally extend perpendicular to and adjoin the flattening rib 71. See FIG. 1.

Figure 6:
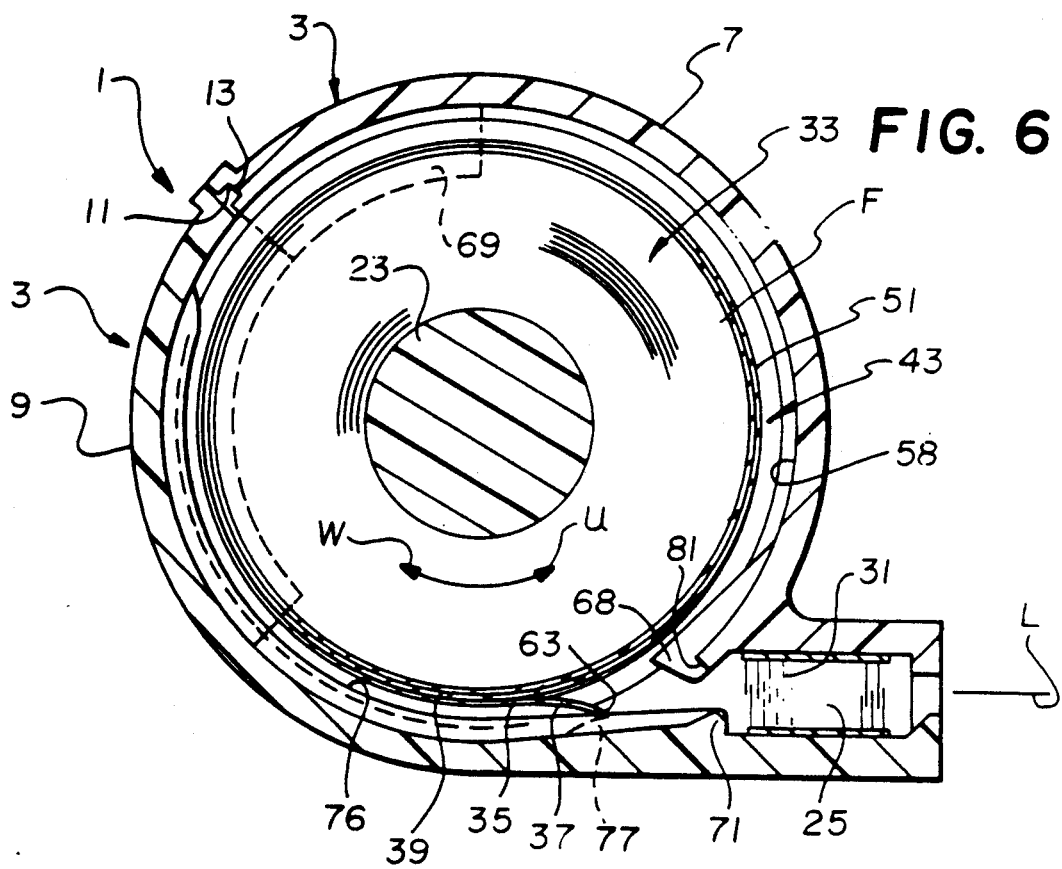
Figure 7:
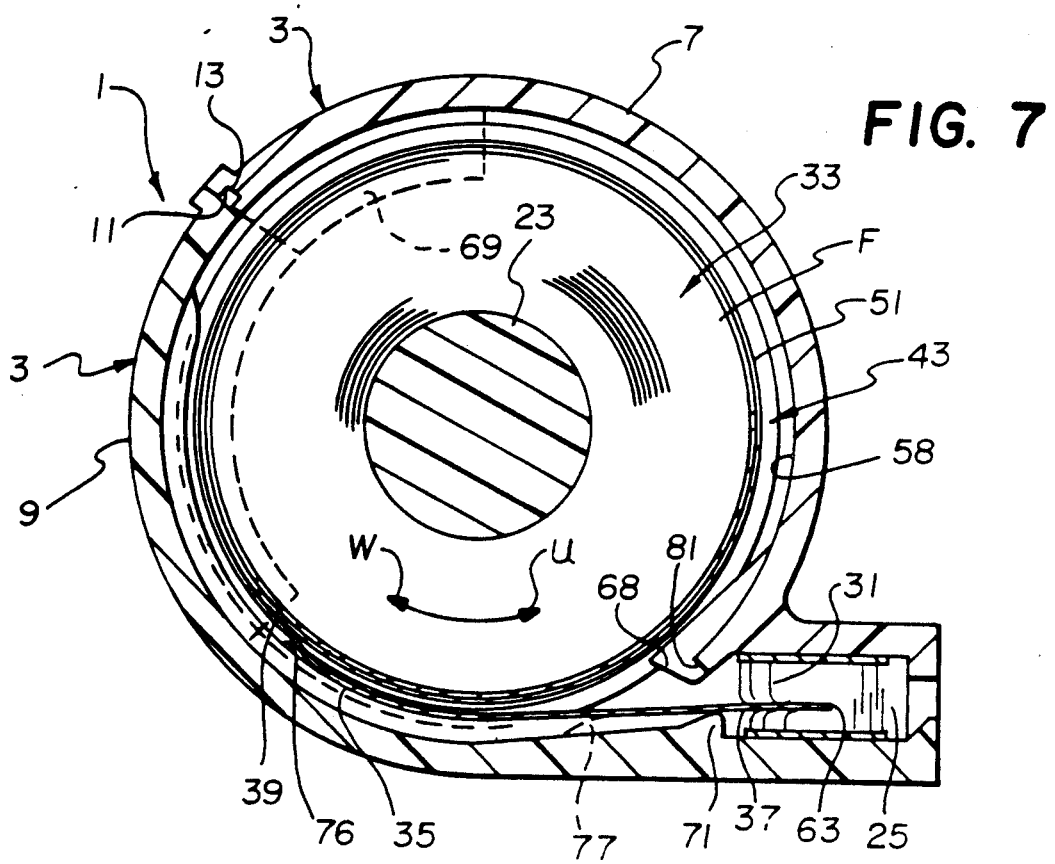
Figure 11:
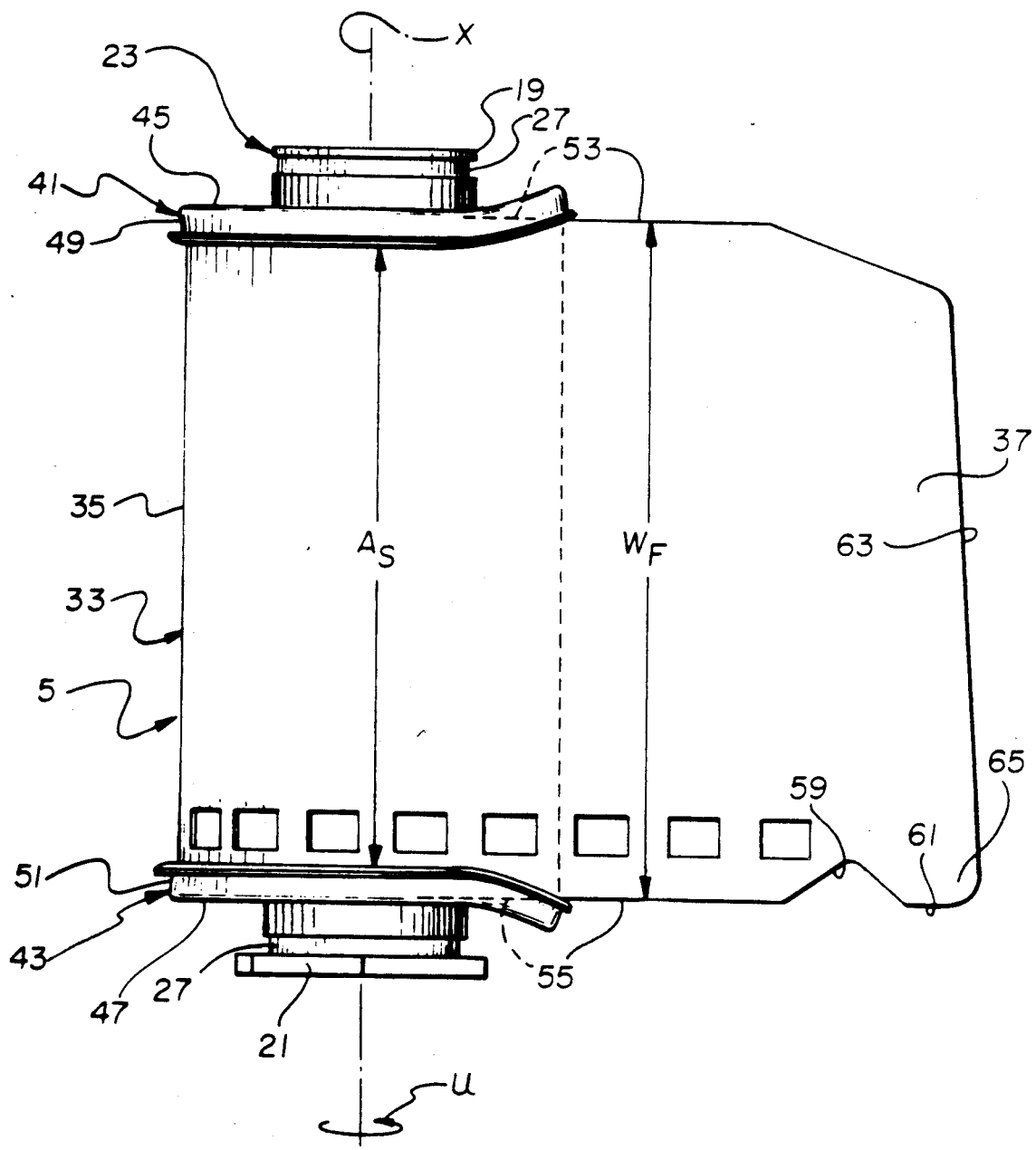
Figure 12:
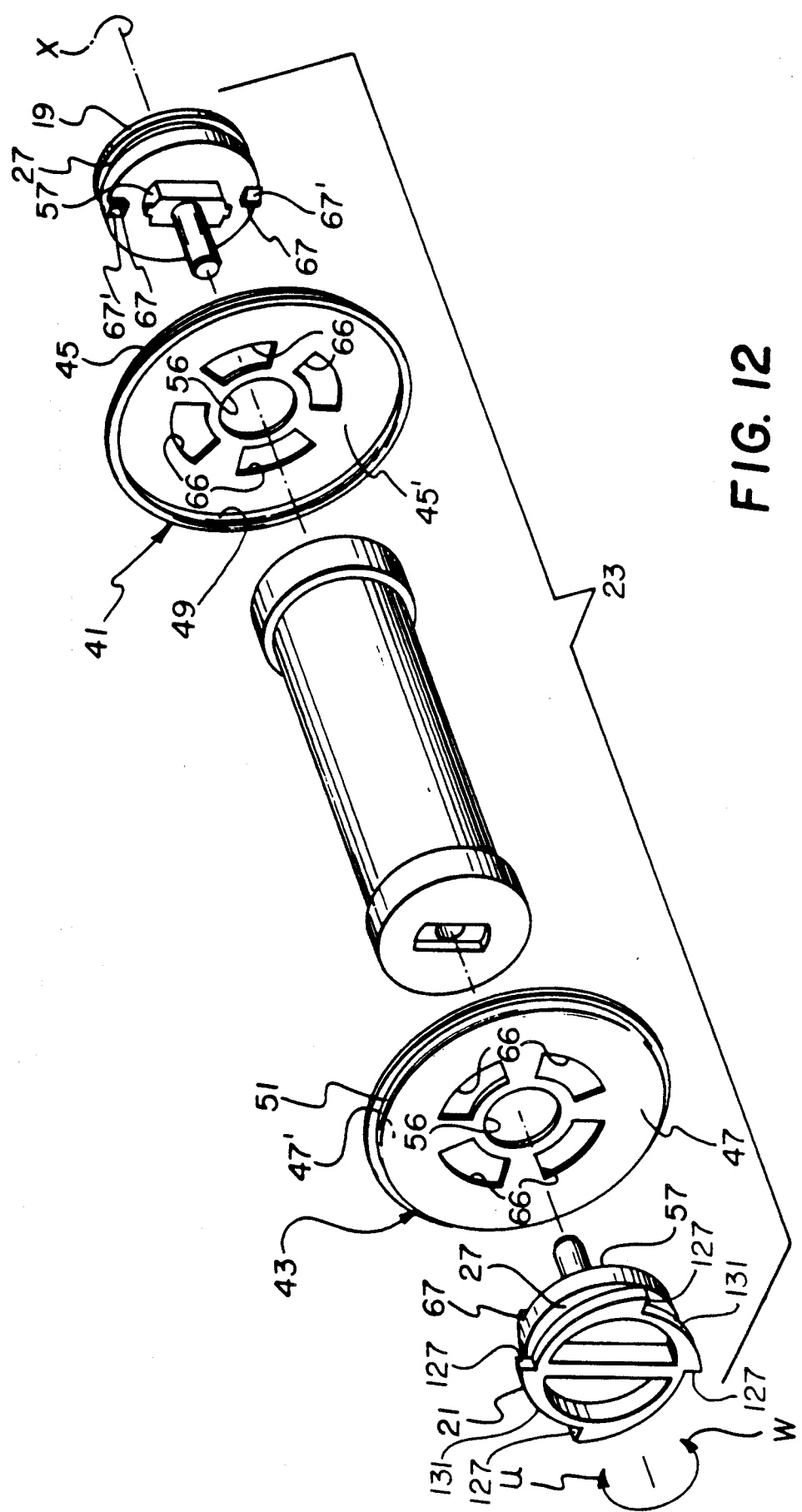
FIG. 12 is an exploded perspective view of the film spool without the film roll.

When the spool core 23 is initially rotated in the film unwinding direction U, the two flanges 41 and 43 momentarily tend to remain stationary and the film roll 33, since its inner end is attached to the spool core, will expand radially or clock-spring to force the film leader (outermost convolution) 35 firmly against the annular lips 49 and 51 of the flanges. Generally however, before the film roll 33 can be expanded radially to the extent a non-slipping relation would be created between the film leader (outermost convolution) 35 and the annular lips 49 and 51 as in cited U.S. Pat. No. 4,834,406 and No. 4,848,693, the hook-like members 67 will have moved along the respective slots 66 into engagement with the two flanges 41 and 43 to fix the flanges to the spool core. Then, further rotation of the spool core 23 will similarly rotate the flanges 41 and 43. As a result, the leading end 37 of the film leader (outermost convolution) 35 will be advanced over the shorter rib 77 and the stripper-guide 68, causing successive arcuate portions of the flanges 41 and 43 to be flexed away from one another as shown in FIG. 11. This first allows the notch 59 to separate from the lip section 51', and then it allows successive longitudinal sections of the film leader 35 to exit from between the flanges to the outside of the cassette shell 3. Since the stripper-guide 68 initially picks up the leading end 37 of the film leader 35 close to its forward-most tip 65, the forward edge 63 of the leading end will move against the film flattening rib 71 as shown in FIG. 6.

When the film leader 35 is thrust through the film passageway 25 to the outside of the cassette shell 3, the passageway due to the plush material 31 presents some resistance to outward movement of the leader. This resistance causes the leader 35 to further flex the flanges 41 and 43 away from one another to, in turn, allow more of the leader to uncoil from between the flanges. If the two ribs 75 and 76 were omitted from the shell half 9, the leader 35 would uncoil against the interior wall 58 of the shell half. As a result, increased torque would be required to rotate the spool core 23 in the film unwinding direction U. However, the two ribs 75 and 76 serve to severely limit the extent to which the leader 35 can uncoil from between the flanges 41 and 43.

If the spool core 23 is rotated in the film winding direction W after some length of the filmstrip F has been advanced from the cassette shell 3, the spool core is free to rotate relative to the two flanges 41 and 43 because the hook-like members 67 can move along the respective slots 66 out of engagement with the flanges. This permits the flanges 41 and 43 to be independently rotated in the winding direction W, though at a slower speed than the spool core 23 is rotated in that direction. Each of the hook-like members 67 may back out of one of the slots 66 and into the next slot during continued rotation of the spool core 23 in the winding direction W. At the same time, the filmstrip F will be rewound onto the spool core 23 between the flanges 41 and 43. The spool core 23 is rotated in the winding direction W substantially until the slot 75 in the film leader 35 receives the free end 79 of the tooth 77 to thus engage the film leader to the tooth.

THE FILM EXPOSURE STATUS INDICATOR OF THE FILM CASSETTE

Figure 14:
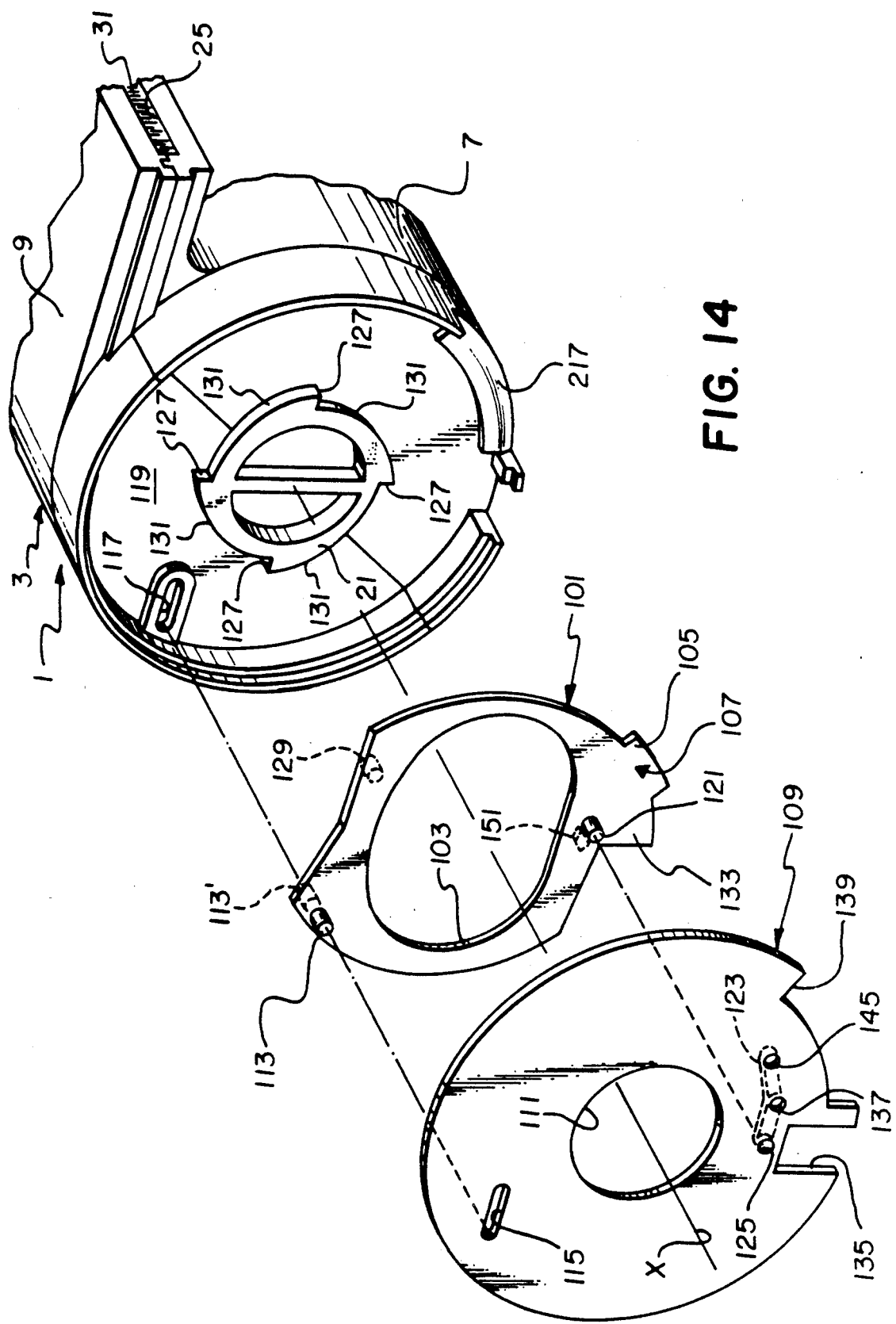
FIG. 14 is an exploded perspective view of the film exposure status indicator.
Figure 15:
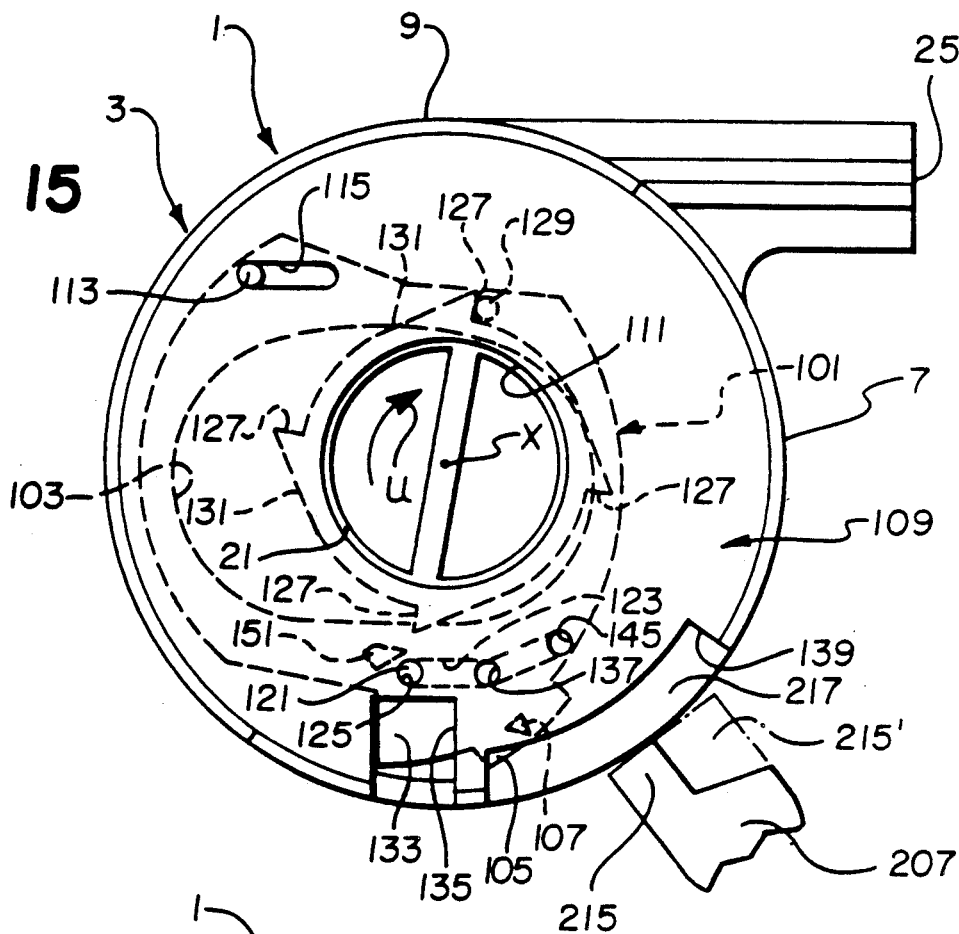
FIG. 15 is an end view of the film cassette, illustrating the film exposure status indicator in an position.
Figure 16:
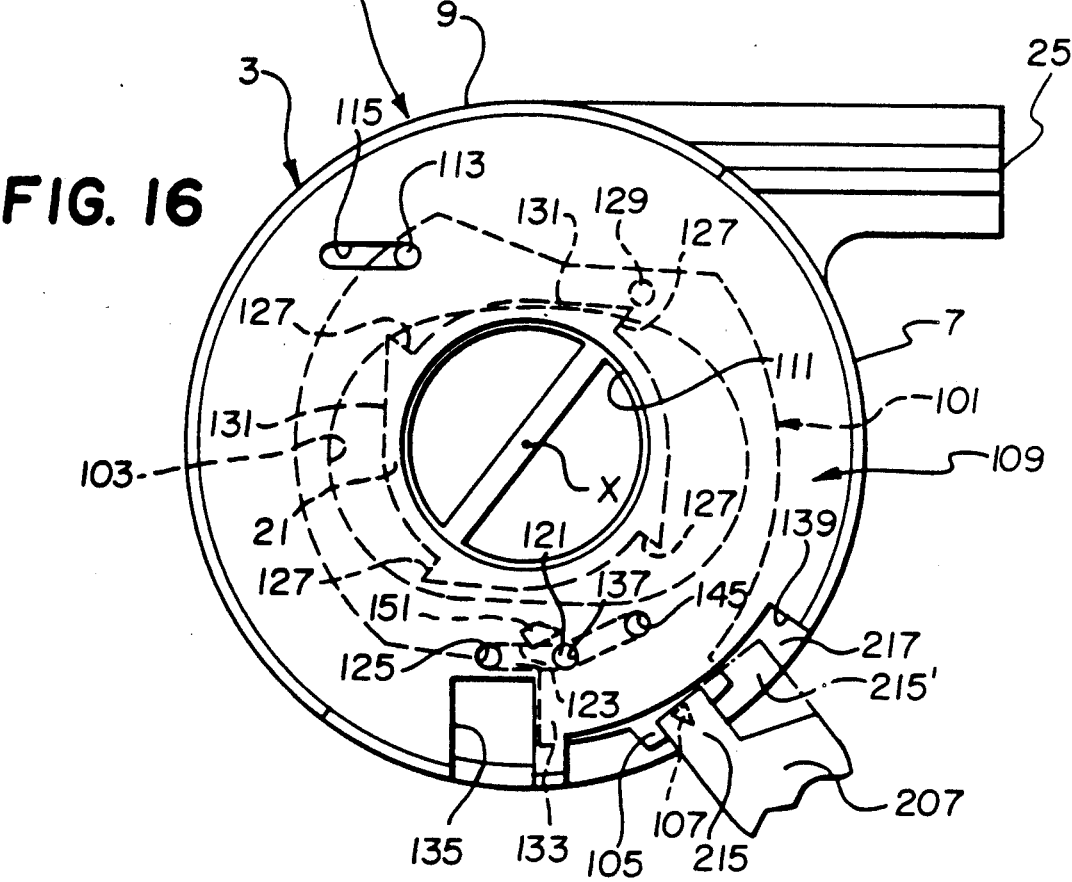
FIGS. 16 and 17 are end views similar to FIG. 15, illustrating the film exposure status indicator moved to fully exposed and partly exposed positions, respectively.
Figure 17:
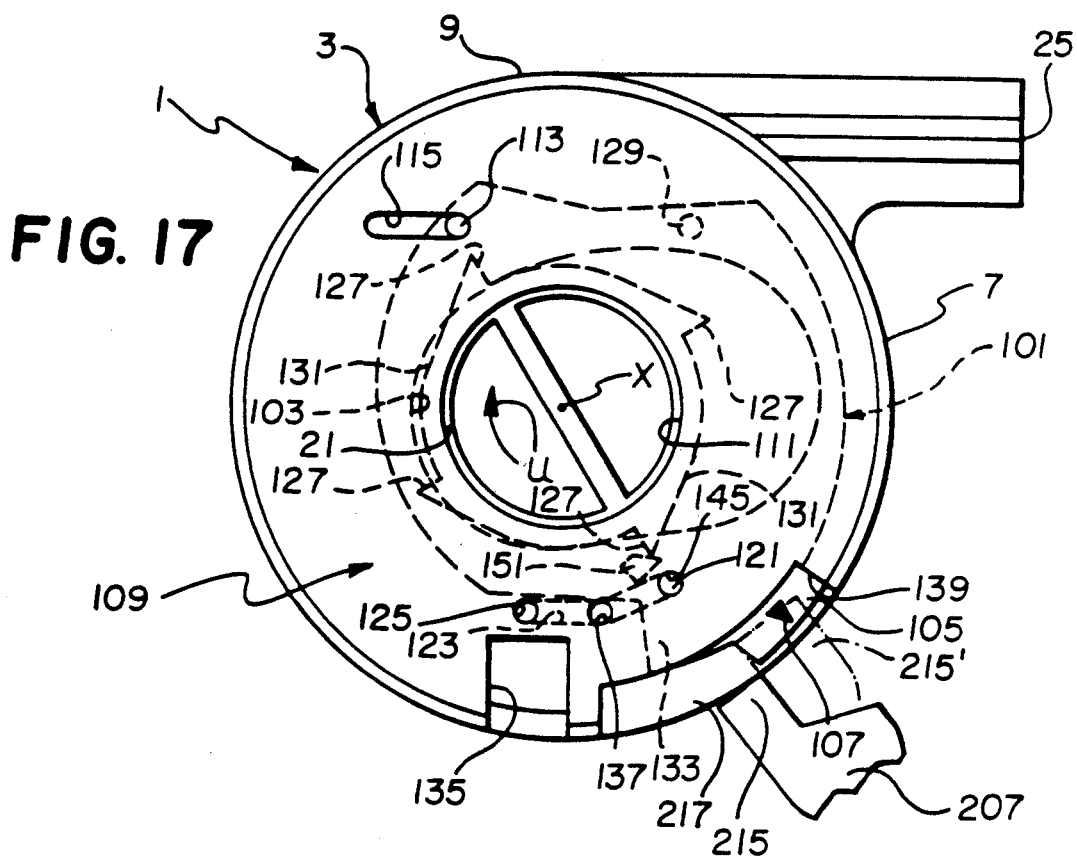
Figure 18:
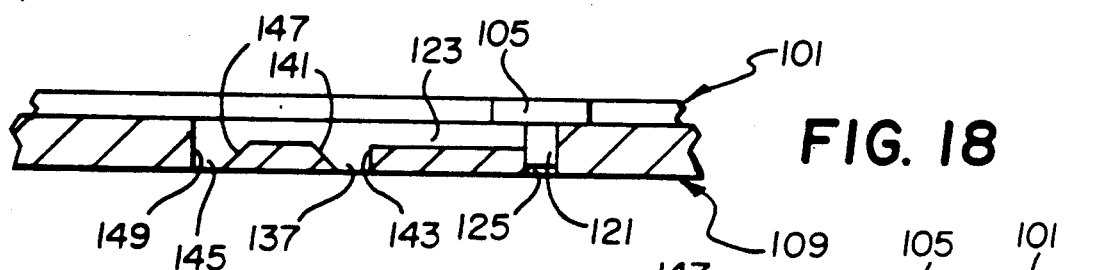
FIG. 18 is a schematic view partly in section, depicting the film exposure status indicator secured in its unexposed position.
Figure 20:
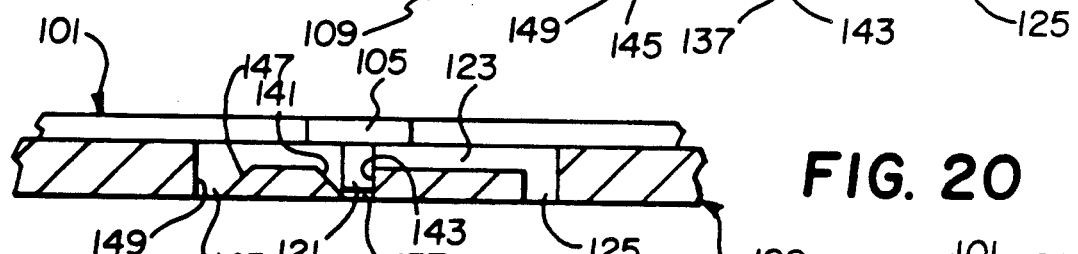
FIGS. 20 and 21 are schematic views similar to FIG. 18, depicting the film exposure status indicator moved to its fully exposed and partly exposed positions, respectively.
Figure 21:
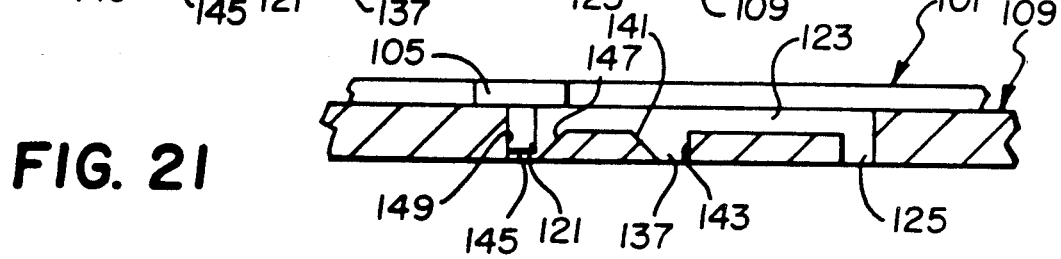

FIGS. 1–3, 13 and 14 depict a ring-like unit 101 having a sideways-elongate opening 103 aligned with the longer open-end piece 21 of the spool core 23 to allow the ring-like unit to be shifted laterally of the spool core from a normal or unexposed position shown in FIGS. 15 and 18 to a fully exposed position shown in FIGS. 16 and 20, to a partly exposed position shown in FIGS. 17 and 21, and back to the fully exposed position. The ring-like unit 101 includes a peripheral tab 105 having an indicator 107 which is aligned with respective imprints "EXP" and "PARTIAL", printed on the outside of the cassette shell 3, when the ring-like unit is in its fully exposed and partly exposed positions. A cover 109 forming part of the cassette shell 3 overlays the ring-like unit 101 and has a central opening 111 for access to the longer open-end piece 21 of the spool core 23 in order to rotate the spool core in the unwinding and winding directions U and W. The cover 109 and the ring-like unit 101 include respective engaging means for constraining the ring-like unit to movement laterally of the spool core 23 to the fully exposed and partly exposed positions. Preferably, the engaging means comprises respective pin-halves 113 and 113' projecting from opposite sides of the ring-like unit 101 into a slot or channel 115 formed in the cover 109 and a slot or channel 117 formed at an end piece 119 of the cassette shell 3, and a pin 121 projecting from one side of the ring-like unit into a groove 123 cut in the underside of the cover.

When the ring-like unit 101 is in its unexposed position, the pin 121 extends into a first hole 125 formed in the cover 109 at the groove 123, to releasably secure or arrest the ring-like unit in the unexposed position. See FIGS. 15 and 18. At this time as shown in FIGS. 14 and 15, the spool core 23 cannot be rotated substantially in the unwinding direction U because one of four peripheral radial teeth 127 formed on the longer open-end piece 21 of the spool core will engage a pin 129 projecting from one side of the ring-like unit 101 into the circular path of the teeth. Conversely, the spool core 23 cannot be rotated substantially in the winding direction W because one of four peripheral edge portions 131 intermediate the respective teeth 127 will engage the pin 129.

Figure 19:
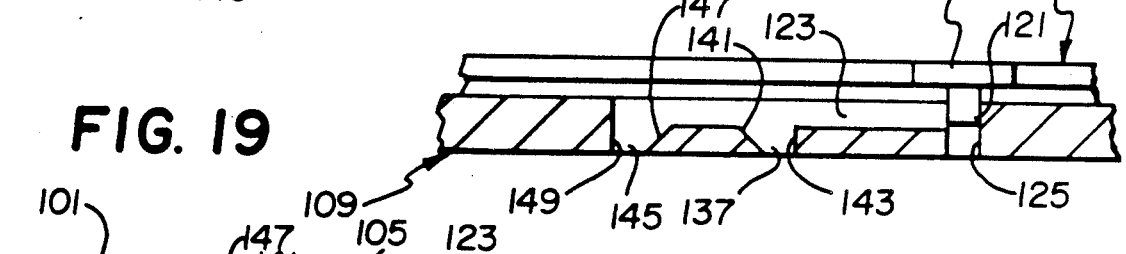
FIG. 19 is a schematic view similar to FIG. 18, depicting the film exposure status indicator released in its unexposed position.

If the pin 121 is forced out of the first hole 125 and into the groove 123 as shown in FIG. 19, by pressing against the ring-like unit 101 at a push portion 133 of the ring-like unit located in a cut-out 135 in the cover 109, the ring-like unit will be freed to be shifted out of its unexposed position shown in FIGS. 15 and 18. Consequently, the spool core 23 will be freed to rotate in the unwinding direction U (and the winding direction W).

If the spool core 23 is rotated in the unwinding direction U, with the pin 121 removed from the first hole 125, one of the teeth 127 will drive the pin 129 to shift the ring-like unit 101 from its unexposed position shown in FIGS. 15 and 19 to its fully exposed position shown in FIGS. 16 and 20. During this occurrence, the pin 121 will be moved along the groove 123, coming to rest in a second hole 137 formed in the cover 109 at the groove. Simultaneously, the push portion 133 of the ring-like unit 101 will be moved out of the cut-out 135 in the cover 109, and the peripheral tab 105 of the ring-like unit will be moved from beneath the cover and into a cut-out 139 in the cover. The peripheral tab 105 will come to rest with the indicator 107 pointing to the imprint "EXP".

When the pin 121 is in the second hole 137, the ring-like unit 101 can be shifted from its fully exposed position shown in FIGS. 16 and 20 to its partly exposed position shown in FIGS. 17 and 21; however, the ring-like unit cannot be shifted back to its unexposed position shown in FIGS. 15 and 19. This is due to the fact that one side 141 of the second hole 137 is inclined and another side 143 of the second hole is vertical in FIG. 20.

The ring-like unit 101 is shifted from its fully exposed position shown in FIGS. 16 and 20 to its partly exposed position shown in FIGS. 17 and 21 by sliding the peripheral tab 105 of the ring-like unit to move the indicator 107 from alignment with the imprint "EXP" to alignment with the imprint "PARTIAL". During this occurrence, the pin 121 will be moved out of the second hole 137 and along the groove 123, coming to rest in a third hole 145 formed in the cover 109 at the groove. See FIG. 21.

When the pin 121 is in the third hole 145, the ring-like unit 101 can be shifted from its partly exposed position shown in FIGS. 17 and 21 only to its fully exposed position shown in FIGS. 16 and 20. This is due to the fact that one side 147 of the third hole 145 is inclined and another side 149 of the third hole is vertical in FIG. 21.

If the spool core 23 is rotated in the unwinding direction U, with the pin 121 in the third hole 145, one of the teeth 127 will drive a block 151 projecting from one side of the ring-like unit 101 into the circular path of the teeth to shift the ring-like unit from its partly exposed position shown in FIGS. 17 and 21 to its fully exposed position shown in FIGS. 16 and 20. During this occurrence, the pin 121 will be moved out of the third hole 145 and along the groove 123, coming to rest in the second hole 137. See FIG. 20.

As can be appreciated from comparing FIGS. 16 and 17, when the ring-like unit 101 is in its fully exposed position, the pin 129 is out of reach of the teeth 127, i.e. it is removed substantially from the circular path of the teeth, and the block 151 is in reach of the teeth, i.e. it is located along the circular path of teeth. Conversely, when the ring-like unit 101 is in its partly exposed position, the block 151 is out of reach of the teeth 127 and the pin 129 is in reach of the teeth. This arrangement permits the teeth 127 to shift the ring-like unit 101 to its fully exposed position alternately from its unexposed and partly exposed positions in response to rotation of the spool core 23 in the unwinding direction U.

CAMERA APPARATUS

Figure 22:
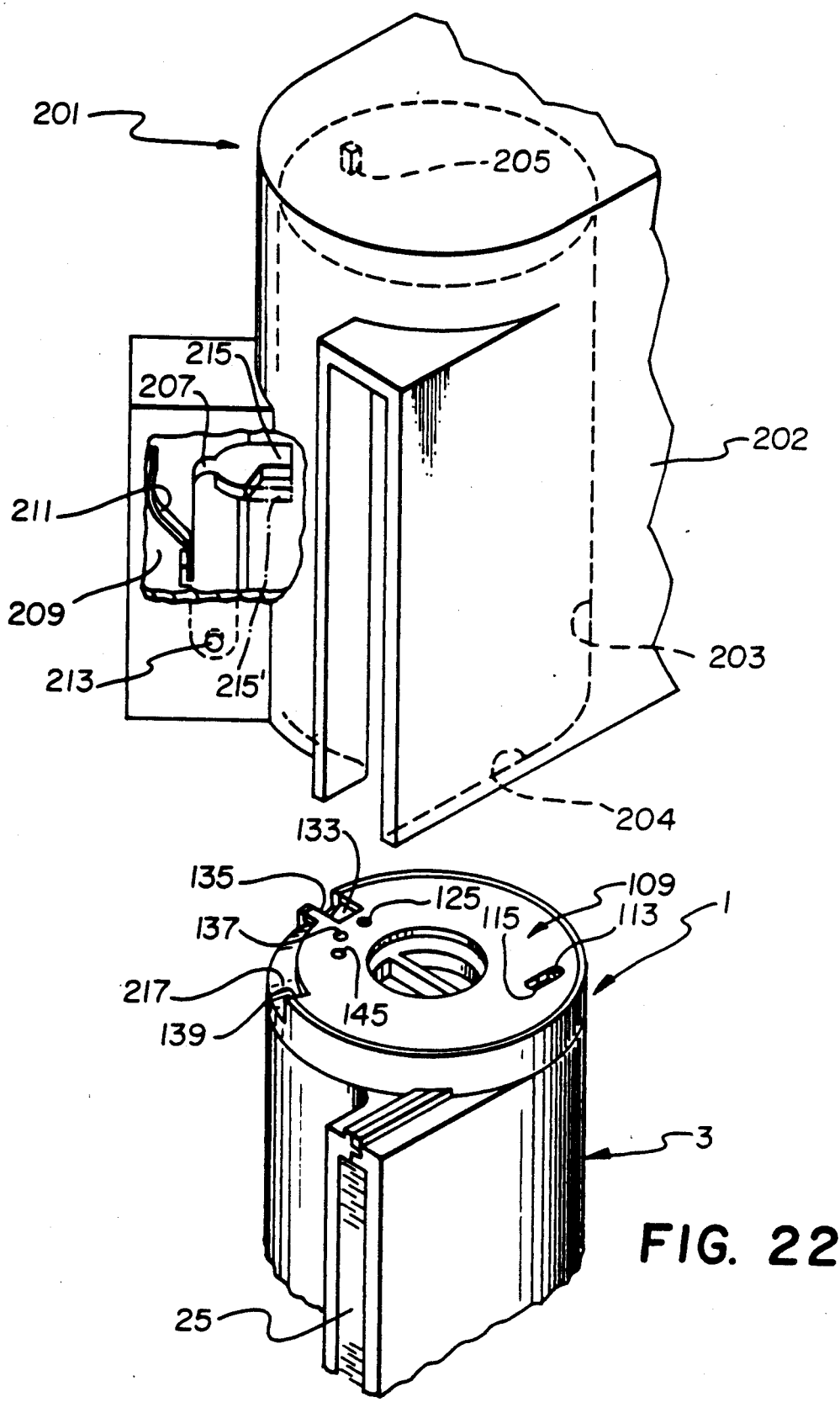
FIG. 22 is a perspective view of the film cassette and camera apparatus for releasing the film exposure status indicator in its unexposed position.

Camera apparatus 201 is shown in FIG. 22 for use with the film cassette. The apparatus includes a camera body 202 having a loading chamber 203 with an entry opening 204 for receiving the film cassette 1 longitudinally, i.e. endwise, into the chamber. A release pin 205 is located at the bottom of the loading chamber 203 for receipt in the cut-out 135 in the cover 109 of the cassette shell 3 to press against the push portion 133 of the ring-like unit 101 to, in turn, force the pin 121 out of the first hole 125 and into the groove 123, when the ring-like unit is in its unexposed position. See FIGS. 15, 18 and 19.

A sensing member 207 located within a slot 209 opening into the loading chamber 203 is urged by a leaf spring 211 to pivot clockwise in FIG. 22 about a support pin 213 until a hook-like end 215 of the sensing member protrudes into the loading chamber. In this normal position, the sensing member 207 is disposed to locate its hook-like end 215 for abutment with a beveled surface 217 of the cassette shell 3 arranged within the cut-out 139 in the cover 109 of the cassette shell. If the film cassette 1 is initially inserted into the loading chamber 203, with the ring-like unit 101 in its unexposed or partly exposed positions, the beveled surface 217 will contact the hook-like end 215 of the sensing member 207 to cam or pivot the sensing member out of the way of the beveled surface to allow the film cassette to be further inserted into the loading chamber. However, should the film cassette 1 be initially inserted into the loading chamber 203, with the ring-like unit 101 in its fully exposed position, the peripheral tab 105 of the ring-like unit (since it has been moved from beneath the cover 109 into the cut-out 139 in the cover) will be caught by the hook-like end 215 of the sensing member 207 to prevent further insertion of the film cassette into the loading chamber.

An alternate embodiment of the sensing member 207 is shown in FIG. 22 to include a phantom-line extension 215' of the hook-like end 215 of the sensing member. If the film cassette 1 is initially inserted into the loading chamber 203, with the ring-like unit 101 in its partly exposed position, the peripheral tab 105 of the ring-like unit will be caught by the phantom-line extension 215' of the hook-like end 215 to prevent further insertion of the film cassette into the loading chamber. Thus, the phantom-line extension 215' is intended for use in a photographic camera that is not designed to receive the film cassette 1 containing partially exposed film.

The invention has been described with reference to a preferred embodiment. However, it will be appreciated that variations and modifications can be effected within the ordinary skill in the art without departing from the scope of the invention.

We claim:

1. A film cassette comprising a film spool supported inside a lighttight cassette shell for rotation in an unwinding direction to thrust a filmstrip coiled about said spool to the exterior of said shell, to expose said filmstrip, and in a winding direction to return exposed film to the interior of the shell, to protect the filmstrip from ambient light, and a film exposure status indicator supported for movement relative to said shell to an exposed position for providing a visible indication that said filmstrip is exposed, is characterized in that:

said spool and said status indicator include respective cooperating means for moving the status indicator to its exposed position automatically in response to rotation of the spool in one of the unwinding and winding directions.

2. A film cassette as recited in claim 1, wherein said respective cooperating means of said spool and said status indicator for moving the status indicator to its exposed position include at least one driving member of the spool and at least one driven member of the status indicator mutually arranged to advance said driving member to move said driven member responsive to rotation of the spool in one of the unwinding and winding directions to move the status indicator to the exposed position.

3. A film cassette as recited in claim 1, wherein said status indicator includes a ring-like unit having a sideways-elongate opening aligned with said spool to allow said ring-like unit to be shifted laterally of the spool to the exposed position, and said respective cooperating means of said spool and said status indicator for moving the status indicator to its exposed position include at least one driving member of the spool and at least one driven member of said ring-like unit mutually arranged to advance said driving member to move said driven member responsive to rotation of the spool in one of the unwinding and winding directions to shift the ring-like unit to the exposed position.

4. A film cassette as recited in claim 3, wherein said driving member radially projects from said spool to engage said driven member.

5. A film cassette as recited in claim 3, wherein a cover overlays said ring-like unit, and said cover and said ring-like unit include respective engaging means for constraining the ring-like unit to movement laterally of said spool.

6. A film cassette as recited in claim 1, wherein said status indicator is supported for movement relative to said shell to a partly exposed position for providing a visible indication that said filmstrip is only partly exposed, and said respective cooperating means of said spool and said status indicator for moving the status indicator to its exposed position include integral means for moving the status indicator from its partly exposed position to the exposed position automatically in response to rotation of the spool in one of the unwinding and winding directions.

7. A film cassette as recited in claim 1, wherein said status indicator is located normally in an unexposed position for providing a visible indication that said filmstrip is unexposed and is supported for movement relative to said shell to a Partly exposed position for providing a visible indication that said filmstrip is only partly exposed and to its exposed position for providing a visible indication that the filmstrip is substantially exposed, and said respective cooperating means of said spool and said status indicator for moving the status indicator to its exposed position include integral means for moving the status indicator to the exposed position directly from its unexposed and partly exposed positions automatically in response to rotation of the spool in one of the unwinding and winding directions.

8. A film cassette as recited in claim 7, wherein said integral means for moving said status indicator to its exposed position directly from its unexposed and partly exposed positions includes at least one driving member of said spool and at least two driven members of said status indicator mutually arranged to advance said driving member to move one of said driven members responsive to rotation of the spool to move the status indicator from the unexposed position to the exposed position and to move the other driven member responsive to rotation of the spool to move the status indicator from the partly exposed position to the exposed position 9. A film cassette as recited in claim 8, wherein said status indicator is supported for movement relative to said driving member to locate said driven member for moving the status indicator from its unexposed position to its exposed position out of reach of the driving member when the status indicator is in the exposed position or its partly exposed position and to locate said driven member for moving the status indicator from the partly exposed position to the exposed position out of reach of the driving member when the status indicator is in the unexposed position or the exposed position.

10. A film cassette comprising a film spool supported inside a lighttight cassette shell for rotation to thrust a filmstrip coiled about said spool to the exterior of said shell whether said filmstrip is unexposed or is only partly exposed, and a film exposure status indicator supported for movement relative to said shell from an unexposed position to respective partly exposed and fully exposed positions for providing visible indications that said filmstrip is only partly exposed or is substantially exposed, is characterized in that:

said spool and said status indicator include respective cooperating means for moving the status indicator to its fully exposed position alternately from its unexposed and partly exposed positions only in response to rotation of the spool.

11. A film cassette as recited in claim 10, wherein said respective cooperating means of said spool and said status indicator for moving the status indicator to its fully exposed position include at least one driving member of the spool and at least two driving members of the status indicator mutually arranged to advance said driving member to move one of said driven members responsive to rotation of the spool to move the status indicator from its unexposed position to the fully exposed position and to move the other driven member responsive to rotation of the spool to move the status indicator from its partly exposed position to the fully exposed position.

12. A film cassette as recited in claim 11, wherein said status indicator is supported for movement relative to said driving member to locate said driven member for moving the status indicator from its unexposed position to its fully exposed position out of reach of the driving member when the status indicator is in the fully exposed position or its partly exposed position and to locate said driven member for moving the status indicator from the partly exposed position to the fully exposed position out of reach of the driving member when the status indicator is in the unexposed position or the fully exposed position.

* * * * *

UNITED STATES PATENT AND TRADEMARK OFFICE
CERTIFICATE OF CORRECTION

PATENT NO. : 5,003,334

DATED : March 26, 1991

INVENTOR(S) : Daniel M. Pagano and Stephen H. Miller

It is certified that error appears in the above-identified patent and that said Letters Patent is hereby corrected as shown below:

Column 4, line 4, after the word "an" add --unexposed--.

Signed and Sealed this

Sixth Day of October, 1992

*Attest:*

DOUGLAS B. COMER

*Attesting Officer*     *Acting Commissioner of Patents and Trademarks*

UNITED STATES PATENT AND TRADEMARK OFFICE
CERTIFICATE OF CORRECTION

PATENT NO. : 5,003,334
DATED : March 26, 1991
INVENTOR(S) : D. M. Pagano
S. H. Miller It is certified that error appears in the above-identified patent and that said Letters Patent is hereby corrected as shown below:

Col. 7, Line 68, delete "The spool core 23 is rotated in the winding direction W"

Col. 8, lines 1-4 , delete "substantially until the slot 75 in the film leader 35 receives the free end 79 of the tooth 77 to thus engage the film leader to the tooth."

Signed and Sealed this

Twenty-eighth Day of September, 1993

*Attest:*

BRUCE LEHMAN

*Attesting Officer*   *Commissioner of Patents and Trademarks*